INVENTOR
GABRIEL GARCIA MORENO
BY
HIS ATTORNEY

Jan. 16, 1934.  G. G. MORENO  1,943,689
MOTION PICTURE OPTICAL SYSTEM AND APPARATUS
Filed April 18, 1931   5 Sheets-Sheet 3

INVENTOR
GABRIEL GARCIA MORENO
BY
His ATTORNEY

Jan. 16, 1934.  G. G. MORENO  1,943,689
MOTION PICTURE OPTICAL SYSTEM AND APPARATUS
Filed April 18, 1931  5 Sheets-Sheet 4

INVENTOR
GABRIEL GARCIA MORENO
BY
Wm H Chapell
His ATTORNEY

Jan. 16, 1934.                G. G. MORENO                 1,943,689
                MOTION PICTURE OPTICAL SYSTEM AND APPARATUS
                    Filed April 18, 1931         5 Sheets-Sheet 5

INVENTOR
GABRIEL GARCIA MORENO
BY
HIS ATTORNEY

Patented Jan. 16, 1934

1,943,689

UNITED STATES PATENT OFFICE 1,943,689

MOTION PICTURE OPTICAL SYSTEM AND APPARATUS

Gabriel Garcia Moreno, Los Angeles, Calif., assignor to Moreno-Snyder Cine Corporation, Ltd., Los Angeles, Calif., a corporation of Delaware Application April 18, 1931. Serial No. 531,200

21 Claims. (Cl. 88—16.8)

This invention relates to the art of photography applicable to motion pictures, and has particular reference to an optical system and apparatus in which the film is moved continuously. It is a general object of the present invention to provide a simple, effective, and commercially practical motion picture optical system and mechanism of the type in which the film is moved continuously.

The present invention is applicable, generally, to the art of motion pictures in that various phases of the invention are applicable to projectors and also cameras. Throughout this specification, particular reference will be made to the invention as applied to a camera; however, it is to be understood that such reference is not to be construed as limiting the broader features of the invention to this particular application.

Cameras and projectors now in general use in the art of motion pictures are of the intermittent type, i. e., are of such nature as to require intermittent movement of the film in synchronism when a shutter. This type of apparatus necessarily involves rapidly reciprocating or intermittently moving parts productive of vibration, noise, and other undesirable conditions. Further, each picture on a film taken in the ordinary intermittent type of camera is of limited exposure and is of the image in a particular position. In projection, the pictures are projected onto the screen in rapid succession, and the eye of the observer functions so that the picture is apparently smooth and continuous.

It has long been recognized as desirable to overcome the undesirable characteristics of the ordinary or intermittent type of motion picture apparatus by the provision of apparatus in which the film is constantly or continuously moved. The optical systems and mechanisms heretofore proposed to handle film continuously have usually involved a multiplicity of moving elements in the optical system, arrangements in the optical system making accurate pictures impossible or impractical, complicated mechanical structures or arrangements making them impractical, etc.

It is an object of this invention to provide an optical system for motion picture apparatus of the character mentioned in which the image is moved in synchronism with the film by means of a single moving part intercepting the light.

It is a further object of the invention to provide an optical system of the character just mentioned in which the light, in the case of a camera, may pass directly from the object to the film through the optical system without being handled by reflectors or like elements.

A further object of the present invention is to provide an optical system of the general type referred to, including means for controlling the framing of the picture obtained on the film. My invention provides for the control of the size and spacing of the pictures on the film.

Another object of the present invention is to provide an optical system of the general character mentioned including a light control operable to govern the exposure obtained on the film. This feature of the invention, taken with that mentioned in the preceding paragraph, gives the optical system means of control corresponding to that of the optical system used in the intermittent type of camera.

A further object of the present invention is to provide an optical system of the general character hereinabove referred to in which objective lenses of the type and focal lengths commonly employed in motion picture cameras can be used.

Another object of this invention is to provide a simple, effective, and commercially practical optical system for taking pictures on a continuously moving film without employing shutters or other means interrupting the light passing from the object to the film. By the present invention, the film is continuously exposed, making it possible to gain a given exposure of the film with a slower lens than would be required in the standard intermittent type of camera.

Another object of this invention is to provide a motion picture apparatus in which the film is moved continuously at the point of exposure and is handled in a manner to avoid kinking or other complications.

Another object of this invention is to provide apparatus of the character mentioned in which the film feeding means is definitely timed or related to the moving element of the optical system so that the moving parts cannot get out of synchronism.

The invention has for another object the arrangement of parts in a manner to minimize the number and size of moving parts so that the apparatus is simple of construction and operates smoothly and silently.

Another object of the present invention is to provide apparatus of the character mentioned in which all of the moving parts revolve and ars such that they can be easily balanced to make the mechanism silent and free of vibration.

It is another object of this invention to provide apparatus of the character mentioned in which the principal parts are readily accessible, the parts being assembled in units detachable one from another so that they can be handled easily and conveniently.

The various objects and features of my invention will be best and more fully understood from the following detailed description of a typical form and application of the invention, throughout which description reference is had to the accompanying drawings, in which.

The present invention provides an optical system applicable, generally, to the production, i.e., both the taking and the projection of motion pictures, and provides features of construction applicable, generally, to motion picture apparatus. In the present disclosure, I will make reference to the invention as applied to or embodied in a camera, and in the course of such disclosure the invention will be set forth in a form intended primarily for a camera. It is to be understood that, insofar as the invention is applicable both to a camera and projector, it is to be construed as applied to either or both, and that the use of the term "camera" is not to be construed as limiting those features of the invention that are thus applicable to both cameras and projectors.

The optical system of the present invention, considered apart from the mechanical or structural features of the invention, includes, generally, a mat or exposure aperture A, an objective lens B, a moving lens unit C, a corrective lens D, and an exposure control E.

In the preferred form of the invention, the parts of the optical system are arranged in the order or sequence in which they have been named, i. e., the mat A is the foremost part of the system, while the exposure control E is the rearmost part and is located immediately in front of the film F.

The mat A has an opening or exposure aperture 10 that determines the size and shape of the frames or pictures obtained on the film. The position of the mat along the axis of the optical system and the size of the aperture 10 bear a direct relation to the objective lens B and, in practice, must be adjusted with the lens or with relation to the lens B if the frames or pictures on the film F are to be kept constant in size and shape and are to be properly spaced.

The objective lens B corresponds, generally, to the objective lens of an ordinary or standard type of motion picture camera. The lens B may be of any standard type or construction, for instance; objective lenses may be used in the same optical system having focal lengths covering the range which has been found practical for motion picture work. Because of the absence of a shutter in the optical system, there is a constant exposure of the film F, making it possible to gain a given amount of exposure of the film with a slower lens than would be required in the intermittent type of camera in which the film is only exposed about half the time.

The moving lens unit C functions to move the image-bearing shaft or shafts of light in synchronism with the film F. The invention contemplates a constant movement of the film F in a direction transverse of the longitudinal axis of the optical system, for instance, as indicated in the diagrams, Figs. 10 and 11, the film F may be considered as being moved constantly downward across the axis of the optical system. The moving lens unit intercepts the light passing from the object to the film at one point only in the optical system and is moved across the axis of the optical system constantly and in a direction opposite to that in which the film is moved. The moving lens unit moves across the axis of the optical system at a point behind the objective lens B, i. e., at a point located between the objective lens B and the film F.

In practice, the moving lens element is annular in its general configuration and is rotatably mounted so that it intersects the axis of the optical system at the desired point, while the portion of the film F that is exposed is within the moving lens unit. In general, the moving lens unit has its inner face 12 curved concentric with the axis of rotation of the unit, while its outer face is polygonal, as is clearly illustrated in Figs. 10 and 11 of the drawings. In practice, the moving lens unit is built up of a plurality or series of lens elements 13, arranged together end to end. The inner face of each lens element is curved generally about the center of the unit, while the outer face of each element is flat. As the lens unit C rotates about its axis, the lens elements 13 are moved across or through the axis of the optical system one after the other, each element acting to distort or bend the light handled by the optical system and move it in synchronism with the film to form a picture exposure on the film as the film passes through or across the optical system.

Figures 9, 10:
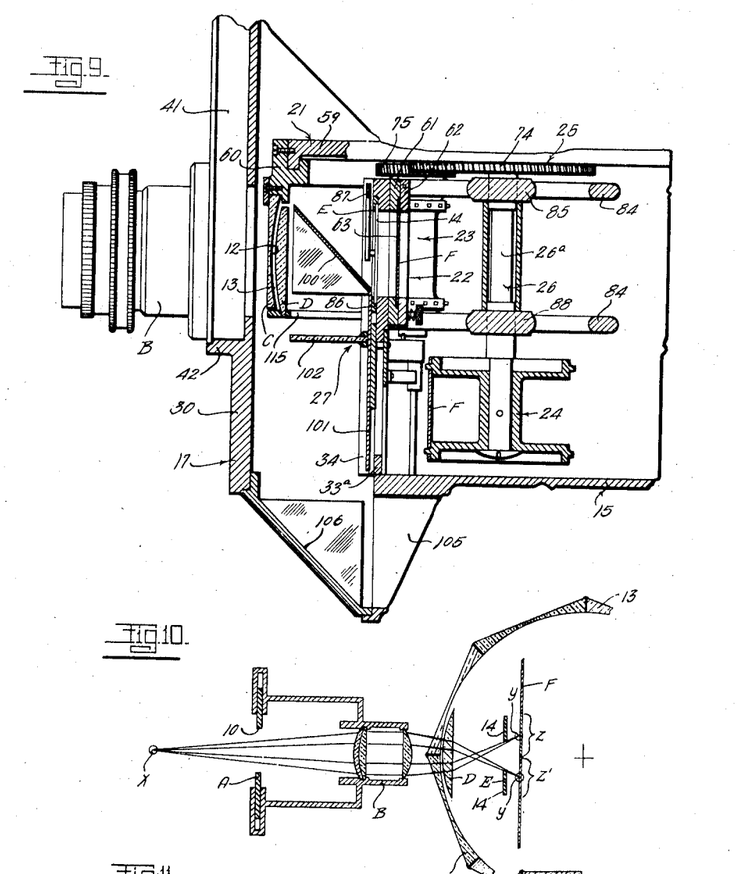
Fig. 9 is an enlarged detailed sectional view taken as indicated by line 9—9 on Fig. 3.
Figs. 10 and 11 are diagrammatic views illustrating the optical system of the present invention.
Figure 11:
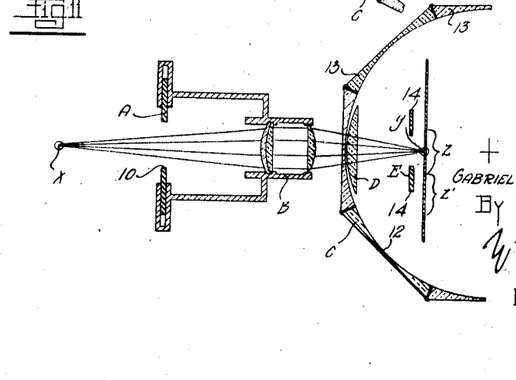

The diagrams, Figs. 10 and 11, illustrate the action of the lens elements 13 as they are moved across the axis of the optical system. For the purpose of illustration, a point X is marked as a given point on the object to be photographed. Light from the point X passes through the objective lens B and falls upon the leading portion of the lens element 13 which is entering the optical system. The leading portion of the lens element is such as to cause a substantial deflection of the light upwardly, causing it to fall on the film F at a point Y which may be considered at the center of a picture frame Z. As the lens element 13 moves up and into the optical system, its upward bending effect upon the light decreases until it reaches a central position, as illustrated in Fig. 11, where it has no bending effect whatever upon the light. Thus, as the lens element 13 moves up into the optical system to the central position, the point Y, which is an image of the point X of the object, moves from an extreme up position shown in Fig. 10 to a point where it coincides with the longitudinal axis of the optical system. During this movement of the image Y, the film is correspondingly moved so that the image Y is in the center of the frame Z when the lens element 13 is positioned as shown in Fig. 11. As the lens element advances beyond the central position illustrated in Fig. 11, it operates to bend the light from the object down, this effect increasing as the lens element moves through the optical system until the trailing portion of the lens element is leaving the optical system, at which time the image will have moved downwardly to a point such as is indicated at $Y^1$ in Fig. 10, the film having moved correspondingly so that the point has remained in the center of the picture frame. The point $Y^1$ in Fig. 10 represents the center of a picture frame $Z^1$ ahead of the picture frame Z in which the point Y is located.

The corrective lens D is located immediately behind the moving lens unit, i.e., it is located just inside the moving lens unit so that it is between the moving lens unit and the film F. From the foregoing description, it will be obvious that the bending of the light by the lens elements of the moving lens unit is more or less of a prismatic action which, of itself, would create an enlargement of the image and distortion, particularly spherical, and chromatic aberration. The corrective lens D is balanced to the lens elements 13 to correct or neutralize the enlargement and the distortions characteristic of the lens elements 13 so that true images are obtained on the film F.

The exposure control E operates to throttle or govern the light allowed to fall upon the film F. The exposure control is preferably located immediately in front of the film F and includes a pair of shutter plates 14 normally spaced apart to admit light to the film and adjustable in opposite directions parallel with the axis of movement of the film to widen or narrow the opening through which light is admitted to the film.

The structure in which the optical system is incorporated includes, generally, a body 15, a mat box 16 at the front of the body, a mounting 17 for the objective lens B, a main shaft 18 in the body, drive means for the main shaft including a power drive 19 and a manual drive 20, a lens carrier 21 on the main shaft carrying the moving lens unit C, a gate 22 supported by the body within the moving lens unit to carry the film in position for exposure, drive sprockets 23 for operating the film through the gate, a feed sprocket 24 for handling the movement of the film to and from the feed sprocket, a drive connection 25 between the main shaft 18 and the drive sprockets 23, a drive connection 26 between the main shaft 18 and the feed sprocket 24, a focusing or viewing device 27 in connection with the optical system, and various other parts, the details and functions of which will be hereinafter described.

The body 15 is a box-like structure having a bottom 28, a top 29, a front wall 30, a rear wall 31, and side walls 32 and 33. A feature of the present invention is the formation of the body 15 with an internal partition 34 which forms a mounting or carrier for various parts of the mechanism and which is detachable from the other parts of the body with a section $33^a$ of the side wall 33.

The mat box 16 is located at the front of the camera ahead of the objective lens B and is preferably carried by a frame extension 35 projecting forward from the body 15. The mat box 16 forms a light tunnel open only at its ends, the inner end of the tunnel being open to the objective lens B, and the outer end of the tunnel being open to receive light from the object to be photographed. The mat box 16 further includes a mat holder 37 which carries the mat A of the optical system. In the case illustrated, the mat holder 37 is carried on the supporting frame 35 and carries or supports the sections 38 and 39 of the mat box. The section 38 of the mat box is located between the objective lens B and the mat holder 37 and is of telescopic construction to allow the mat holder to be adjusted longitudinally of the optical system. A set screw 40, or the like, may be provided for setting the mat holder in position on the frame 35 to set the mat in the desired position. The section 39 of the mat box may be a rigid part operating mainly as a shield in front of the mat A.

The mounting 17 for the objective lens B is located at the front of the body 15. In accordance with the construction commonly employed in motion picture cameras, the mounting means 17 includes a lens turret 41 carrying a plurality of objective lenses and mounted in a guide 42 on the front of the body, so that the lenses can be selectively moved into the optical system at the will of the operator by turning the turret to the desired position. A set screw 43 may be provided for setting the turret in adjusted position to prevent shifting of the objective lens when it is in operating position.

The main shaft 18 of the mechanism is mounted transversely in the body so that one end projects through the side 32 of the body into a housing 44 formed on the body to carry the drive mechanisms 19 and 20. The shaft 18 is supported in a bearing 45 in the side wall 32 of the body 15 and preferably extends through the housing 44 so that its outer end is supported in a bearing 46 in the outer wall of the housing 44. Through this construction, the shaft 18 is effectively supported in spaced bearings.

The power drive 19 for the main shaft 17 includes a shaft 47 mounted in the housing 44 so that one end projects and is adapted to receive a suitable driving element 48. A worm 49 is fixed on the shaft 47 and drives a worm wheel 50 rotatably carried on the shaft 18. A releasable clutch 51 is adapted to form a driving connection between the worm wheel 50 and the shaft 18. The clutch 50 includes an internal gear slidably connected with the worm wheel 50 and has an external gear keyed to the shaft 18. When the gears are in mesh, a driving connection is established between the shaft 47 and the shaft 18.

The manual drive 20 includes a shaft 52 mounted in the housing 44 with one end projecting therefrom to be engaged by a hand crank, or the like. A pinion 53 is fixed on the shaft 52 within the housing 44 to mesh with and drive a gear 54 fixed on the shaft 18.

The lens carrier 21 is provided to support and operate the moving lens unit of the optical system and is adapted to be driven by the shaft 18. In accordance with the preferred form of the invention, the lens carrier is driven directly by the shaft 18. For instance, as shown in the drawings, the inner end of the shaft 18 may be provided with a flange 56 and the lens carrier may be formed with a hub 57 that can be fixed to the flange by screws 58, or the like. The main portion or body 59 of the lens carrier projects radially outward from the hub 57. The periphery of the body of the carrier is round and is concentric with the axis of the carrier, the axis of the carrier being coincident with that of the main shaft 18. A peripheral flange 60 is provided on the carrier to support the lens elements 13. The lens elements are supported by the flange 60 through one edge so that they project from the lens carrier and, with the lens carrier, form an open-ended drum-like structure into which the film gate, drive sprockets, and other parts may project, as will be hereinafter described.

The film gate 22 operates to guide the film at the point of exposure and includes, generally, two plates 61 and 62 which fit together or co-operate to form a guide opening 63 through which the film passes. The plate 61 is the main or base plate of the gate and is carried by the partition 34 of the body. The base plate 61 of the gate is slidably mounted in a guide-way 64 provided in the partition 34 and can be slid from the partition when the partition is removed from the other parts of the body. The base plate 61 has an adjustable face 61a which co-operates with the plate 62 in forming the film guide 63. The base plate 61 and its base plate 61a are provided with exposure apertures 66 and 67, respectively, through which the light passes to fall upon the film carried in the guideway 63. The apertures 66 and 67 are made sufficiently wide to accommodate the full picture area of the film F and are sufficiently long in the direction of the length of the film to allow maximum exposure of the film by full opening of the exposure control shutters 14.

The portion of the partition 34 which carries the gate projects into the open end of the drum-like structure formed by the lens unit and lens carrier, so that the gate is located within the lens unit in position so that the film carried by the gate is in line with the optical system. The film gate illustrated in the drawings is fully set forth and claimed in my co-pending application entitled Film gate, filed April 18, 1931, Serial Number 531,203.

The drive sprockets 23 are arranged to drive or operate the film F through the gate 22. In accordance with the preferred construction, there is a drive sprocket 23 at each end of the gate, i.e., there is an upper drive sprocket immediately beyond the upper end of the gate and a lower drive sprocket immediately beyond the lower end of the gate. The drive sprockets 22 and 23 are mounted on shafts 70 parallel with the main shaft 18 and located so that the film, in passing to or from the ends of the gate, is bent in passing around the sprockets. In the preferred arrangement, the drive sprockets 23 are located so that parts 71 of the partition 34 operate to guide the film around the sprockets and maintain the film in proper engagement with the sprockets. The drive sprockets are operated continuously and both operate in the same direction so that the film is uniformly fed through the gate. The shafts 70 which carry the sprockets 23 are supported in bearings 72 projecting from the partition 34. Through this construction, the drive sprockets, as well as the film gate, are supported by the partition and are removable with the partition from the other parts of the mechanism. It will be obvious that the mechanism just described will operate in either direction, i.e., it may be operated to feed the film in either direction through the gate.

The drive 25 for the drive sprockets 23 includes a main pinion 74 mounted concentric with the main shaft 17 and driven by the main shaft 17, and gears 75 fixed on the shafts 70 and meshed with the pinion 74. The main pinion 74 is fixed to the lens carrier 21 concentric with the lens carrier and main shaft 17, so that it revolves as a unit with the lens carrier. The gears 75 on the drive sprocket shafts 70 are equal in size and, being meshed with the pinion 74, are driven in the same direction and at the same speed. Further, it will be obvious that this driving connection establishes a definite operating relationship between the moving lens unit C and the film F, assuring positive synchronism between the movement of the lens unit and the film F. It is also to be noted that this connection between the moving lens unit and the film is extremely simple and free of parts such as might introduce lack of synchronism into the mechanism. The pinion 74 is preferably fixed directly to the face of the body portion 59 of the lens carrier, while the gears 75 are fixed on the inner ends of the sprocket shafts 70, thus allowing the gears and pinions to be readily moved into and out of engagement as the partition 34 of the body is moved to move the parts carried by it into and out of position.

The feed sprocket 24 is provided to handle the passage of film to and from the drive sprockets and, in accordance with the preferred form of the invention, it is mounted concentric with the main shaft 17 and is offset axially from the drive sprockets so that it is not within the moving lens unit. The axial offsetting of the feed sprocket with relation to the drive sprockets is clearly illustrated in Fig. 4 of the drawings. Film from a magazine M mounted on the top of the body is held in engagement with the feed sprocket by a pair of guide rollers 80, and, from the feed sprocket, it makes a loop L in passing around and laterally to the upper drive sprocket, from which it passes down through the gate 22. From the drive sprocket at the bottom of the gate 22, the film makes a loop L¹ around and laterally out of the lens unit and is held in engagement with another part of the feed sprocket by a pair of rollers 81. From the point where the film is held on the feed sprocket by the rollers 81, it passes up and out of the body and into the magazine. The rollers 80 and 81 are mounted on shafts 82 carried by frame members 84 projecting from the partition 34 of the body.

Figure 1:
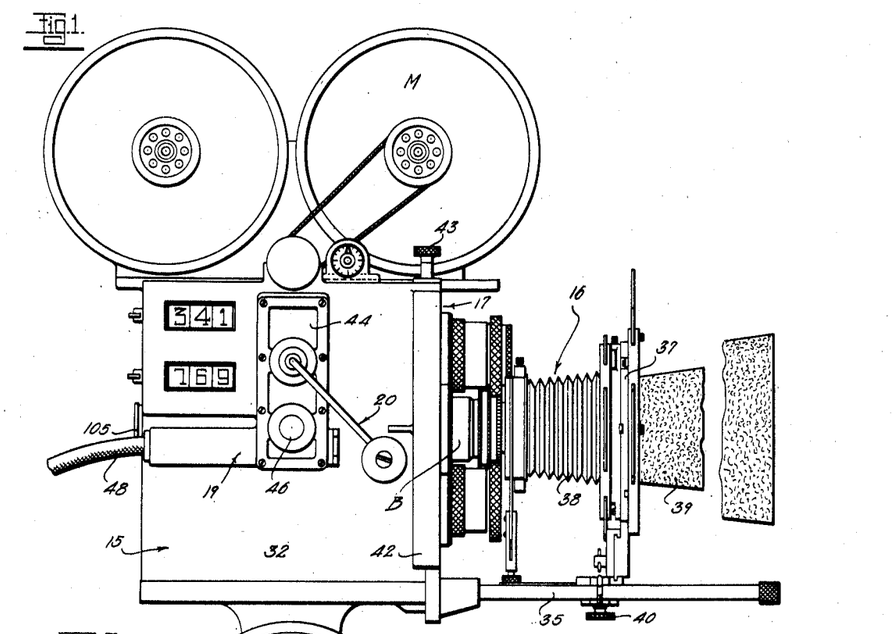
Fig. 1 is a side elevation of a camera embodying the present invention showing the camera viewed from the side and equipped with a power drive or operating means.
Figure 2:
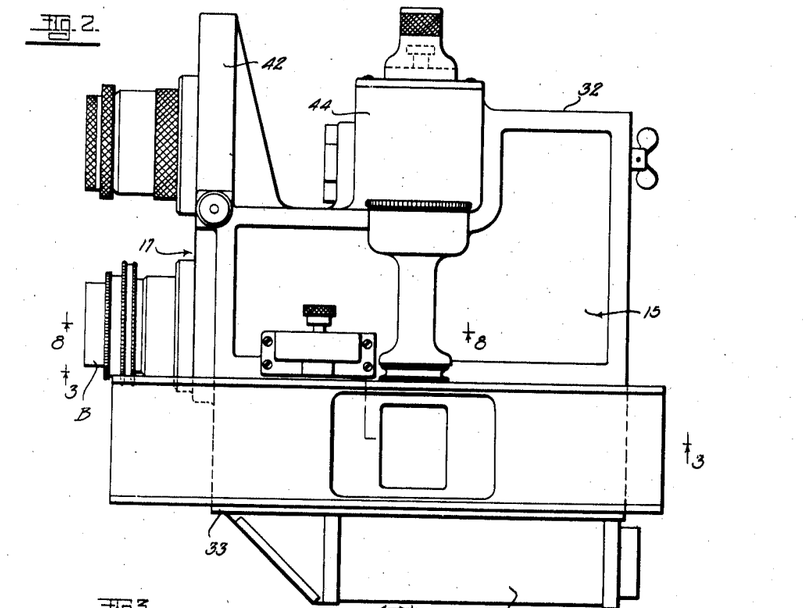
Fig. 2 is a plan view of the camera showing it with the film magazine removed.
Figure 3:
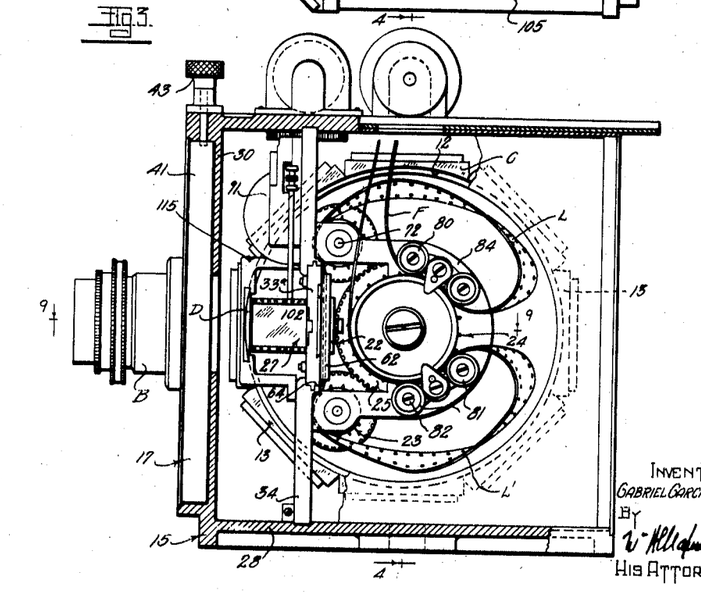
Fig. 3 is a vertical detailed sectional view taken to show the general arrangement and assembly of parts in the camera, being a view taken substantially as indicated by line 3—3 on Fig. 2.
Figure 4:
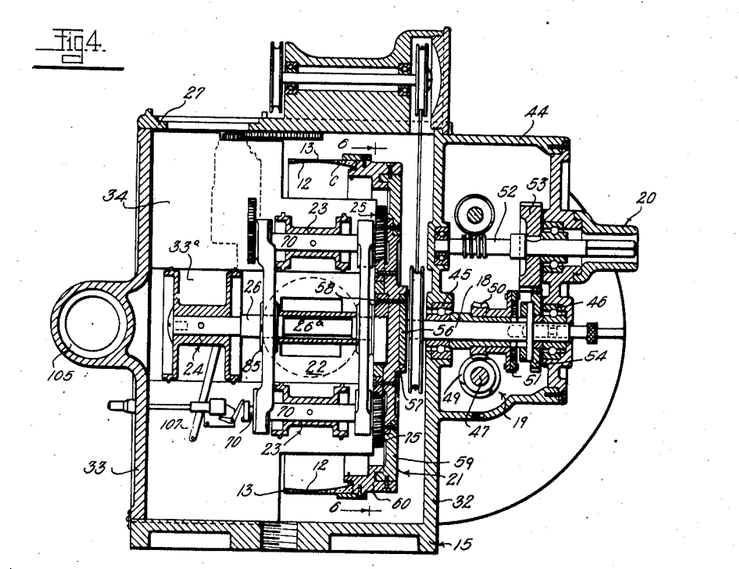
Fig. 4 is a vertical detailed transverse sectional view of the camera taken as indicated by line 4—4 on Fig. 3.

The manner in which the film passes through the mechanism will be readily understood from a consideration of Figs. 3 and 4 of the drawings, Fig. 3 showing the film in position in the mechanism, and Fig. 4 showing the manner in which the feed sprocket is axially offset from the drive sprockets. It will be obvious that the mechanism just described may be operated in either direction.

The drive connection 26 between the feed sprocket 24 and the main shaft 18 may be through a shaft 26a which carries the feed sprocket and is mounted in bearings 85 provided in the frame parts 84. A direct driving connection is established between the shaft 18 and the shaft 26ª.

The exposure control E is preferably located immediately in front of the film gate and, in accordance with the invention, includes two shutter plates 14 operable vertically in opposite directions to regulate the amount of light admitted to the film. In the construction illustrated, the shutter plates 14 are mounted in guideways 86 provided on the front face of the base plate 61 of the gate 22. The shutter plates extend horizontally completely across the aperture or exposure opening 66 in the base plate, and are operable between a separated position where they allow fully opening of the aperture 66 and a completely closed position where they completely shut off light from the aperture 66. The shutter plates are operatively connected to operate in opposite directions. In the construction illustrated, two arms 87 are pivotally connected to the front face of the base plate 61 and have their outer ends yoked to engage pins 88 on the shutter plates. A link 89 operatively connects the lever arms 87 so that the arms move or swing in opposite directions. An operating lever 90 engages the pin 88 on one of the plates.

With the mechanism thus described, operation of the lever 90 causes movement of one of the plates, in this case the upper plate, which movement through the lever connection causes movement of the other plate in the opposite direction. A control mechanism 91 is provided for operating the lever 90 for the purpose of moving the shutter plates to the desired position or setting. It will be obvious that any suitable mechanism other than the automatic control indicated in the drawings may be provided for operating the lever 90. The particular light control mechanism and control therefor illustrated throughout the drawings is fully set forth and claimed in my co-pending application entitled Light control for cameras filed April 18, 1931, Serial Number 531,202.

The focusing or view finding device 27 operates in connection with the optical system so that the operator of the camera can view the object through the objective lens through which the picture is actually taken. The device 27 includes, generally, a reflector 100 supported by a carriage 101, so that it is shiftable into and out of the optical system between the corrective lens and the film. The reflector is located to reflect the light from the objective lens at right angles to the normal axis of the optical system. A ground glass 102 is related to the reflector 100 to receive the light reflected by the reflector, the ground glass being related to the reflector so that it is in the same position with reference to the objective lens as the film is. A suitable viewing device, for instance, a telescopic viewing device 105, may be mounted on the side of the camera so that the image on the ground glass 102 can be viewed from the rear of the camera in the manner usually preferred by camera operators. A reflector 106 may be provided to reflect the image of the ground glass 102 so that it can be viewed by the viewing device 105, as will be apparent from Fig. 9 of the drawings.

Figure 5:
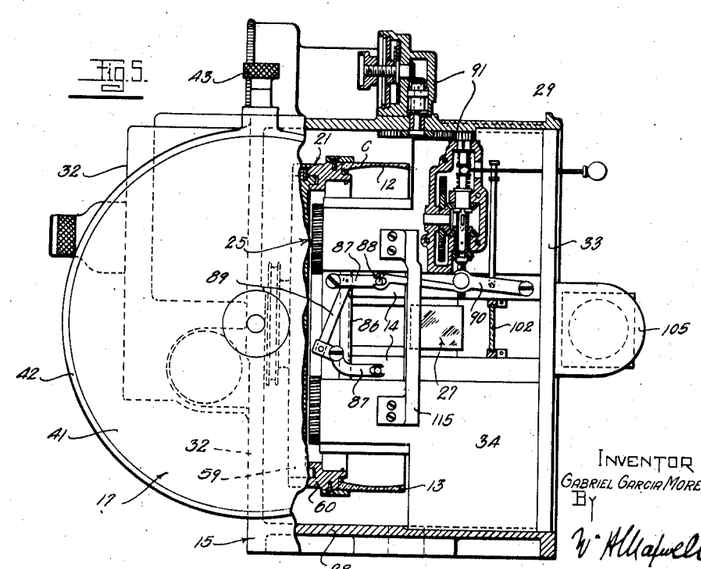
Fig. 5 is a front view of the camera with parts broken away to show in section, being a view illustrating the general arrangement and mounting of the light control.
Figure 6:
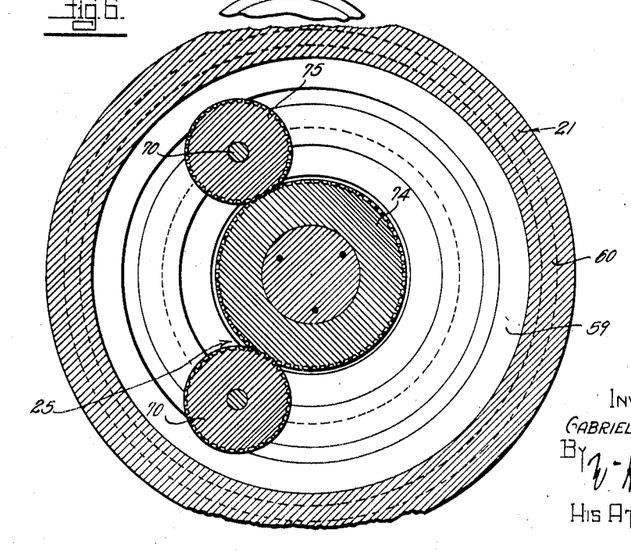
Fig. 6 is a detailed sectional view taken as indicated by line 6—6 on Fig. 4.
Figure 7:
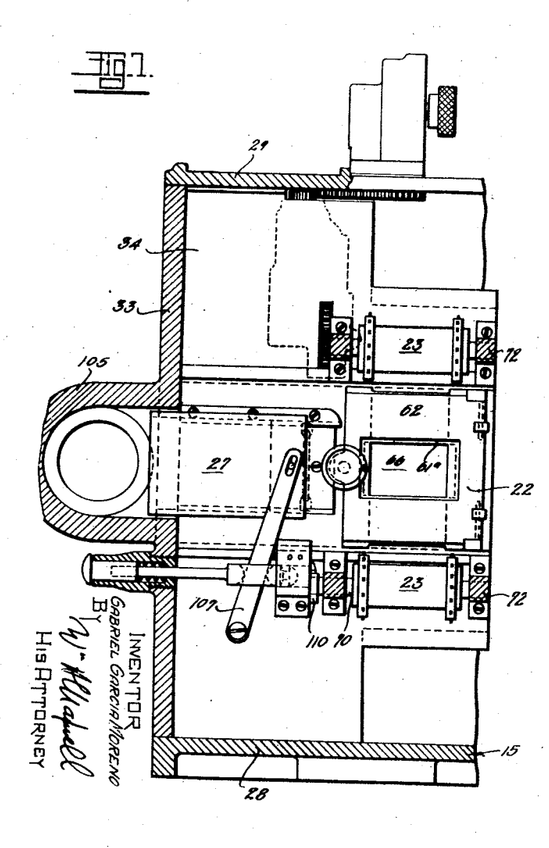
Fig. 7 is a detailed sectional view taken within the camera, being a view looking forward to show the rear side of the film gate.
Figure 8:
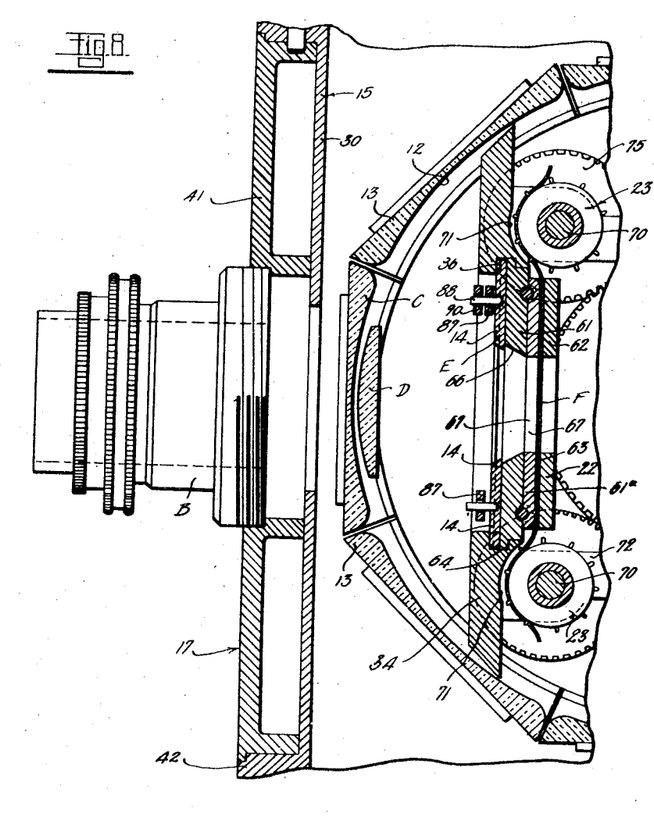
Fig. 8 is an enlarged detailed sectional view taken substantially as indicated by line 8—8 on Fig. 2.

The carriage 101 for the reflector 100 and ground glass 102 is slidably mounted on the front of the partition 34. When the ground glass and reflector 100 are in operating position, as shown in Fig. 9, light passing the objective lens is reflected off and does not reach the film; however, when the camera is in operation, the ground glass and reflector 100 are shifted to the position shown in Fig. 5, so that they do not in any way interfere with the normal action of the camera.

A lever 107 is arranged for operating the carriage to move the reflector 100 and the ground glass 102 into and out of operating position. A manually operable member 107 is provided for operating the lever. In the drawings I have shown an automatic control mechanism 110 driven from one of the sprocket shafts 70 so that the lever 107 is automatically shifted to move the reflector 100 and ground glass 102 out of the optical system when operation of the camera is started. The details of the device 27 and of the operating means therefor, both the means 109 and means 110, are more fully set forth and claimed in my co-pending application entitled Viewing and focus finding device for Cameras, filed April 18, 1931, Serial Number 531,201.

The corrective lens D is mounted in fixed position immediately within the moving lens unit so that it is in proper position in the optical system. A suitable mounting bracket 115, projecting from the front face of the partition 34, holds the corrective lens D.

From the foregoing description of the mechanical features of the invention it will be apparent how the movable lens unit is operated in synchronism with the film so that the lens elements 13 are moved past or through the optical system one after the other to shift the image-bearing shafts of light so that they fall on the film as the film moves, thus producing exposures on the film which, upon being developed, are individual pictures of the object arranged along the film in the manner common to motion picture photography. The individual pictures are, however, exposed longer than is possible in the ordinary intermittent type of camera and, therefore, may not be as sharp in their definition of moving objects as are the pictures taken with an ordinary intermittent camera. However, when the film provided by the present invention is projected continuously through an optical system embodying the invention, the pictures blend together to form a continuous image of perfect definition, the blending of the image being due to the lack of definition in the individual pictures and eliminating the eye strain incidental to the eye of the observer blending successive pictures which are sharp in definition and each distinctly different.

In the construction provided by the present invention, there are but few simple moving parts, the main shaft, lens carrier, feed sprocket, and the drive shaft for the feed sprocket being in effect a single rotating unit, and the drive sprockets and the gears attached to them being the only other two moving parts of the mechanism except for the minor parts outside of the mechanism involved in driving the main shaft 18. Through the extreme simple construction that I have described, noise and vibration are minimized and trouble due to wear or failure of parts is completely overcome.

In the optical system the provision of a single moving element intersecting the shaft of light to move the image and the arrangement by which the image is moved with the film without the use of reflectors or complicated optical arrangements makes the optical system practical and suitable for commercial use. It is also to be noted that the optical system permits the use of objective lenses of comparatively short focal lengths which is a factor of importance for practical commercial photography. The parts required to be located between the objective lens and the film are simple and such that they can be readily mounted and operated in the desired manner.

Having described only a typical preferred form and application of my invention, I do not wish to limit myself to the specific details set forth, but wish to reserve to myself any changes or variations that may appear to those skilled in the art or fall within the scope of the following claims:

Having described my invention, I claim:

1. An optical system for motion picture apparatus comprising means for moving a film, an objective lens located in front of the film so that its axis intersects the film, a moving lens unit moving in synchronism with the film and intersecting the axis of the objective lens at only one point between the objective lens and film, the direction of movement of the unit at said point being opposite to that of the film; and a corrective lens in the path of light between the objective lens and film.

2. An optical system for motion picture apparatus comprising, means for continuously moving a film, an objective lens located so that its axis intersects the film, a moving lens unit intersecting the axis of the objective lens at a single point between the objective lens and film, and a stationary corrective lens in the path of light between the objective lens and film, the moving lens unit including an annular series of prismatic lenses rotating about an axis coincident with that of the series and located so that the part intersecting the axis of the objective lens moves across the axis of the objective lens in a direction opposite to that in which the film moves relative to the axis of the objective lens.

3. In motion picture apparatus, an annular series of lenses revolving about an axis coincident with that of the series, each lens having its inner face concentric with said axis and its outer face substantially flat, a stationary objective lens at the exterior of the annular series of lenses with its axis radial to the axis of the series of lenses, means moving a film within the series of lenses to intersect the axis of the objective lens, said means moving the film continuously in a direction opposite to that of the part of the series of lenses between the objective lens and the film, and a stationary corrective lens between the objective lens and film.

4. In motion picture apparatus, an annular series of lenses revolving about an axis coincident with that of the series, each lens having its inner face concentric with said axis and its outer face substantially flat, a stationary objective lens at the exterior of the annular series of lenses with its axis radial to the axis of the series of lenses, means moving a film within the series of lenses to intersect the axis of the objective lens, a drive operatively connecting said means with the series of lenses so that the film is moved in synchronism with the series of lenses in a direction opposite to that of the part of the series of lenses between the objective lens and the film, and a stationary corrective lens between the objective lens and film.

5. In a motion picture camera, a stationary objective lens, means operating to continuously move a strip of film longitudinally behind and across the axis of said lens, a frame-controlling mat ahead of the objective lens operable to vary the dimensions of the pictures obtained on the film; a continuously moving series of light-deflecting lenses passing across the axis of the objective lens at a single point between the objective lens and film, and a corrective lens in the path of light to the film behind the point where the moving series of lenses cross the axis of the objective lens.

6. In a motion picture camera, a stationary objective lens, means for continuously moving a strip of film longitudinally behind and across the axis of said lens, a continuously moving series of light-deflecting lenses passing across the axis of the objective lens at a single point between the objective lens and film, a light control operable to regulate the amount of light passed to the film, and a corrective lens in the path of light to the film behind the point where the moving series of lenses cross the axis of the objective lens.

7. In a motion picture camera, a stationary objective lens, means for continuously moving a strip of film longitudinally behind and across the axis of said lens, a continuously moving series of light deflecting lenses passing across the axis of the objective lens at a single point between the objective lens and film, means for controlling the amount of light passed to the film, a corrective lens in the path of light to the film behind the point where the moving series of lenses cross the axis of the objective lens, and a light control operable to vary the length of film exposed to light passed by the lenses.

8. In a motion picture camera, a stationary objective lens, a frame-controlling mat ahead of the objective lens, means for continuously moving a strip of film lonigtudinally behind and across the axis of said lens, a continuously moving series of light-deflecting lenses passing across the axis of the objective lens at a single point between the objective lens and film, a corrective lens in the path of light to the film behind the point where the moving series of lenses cross the axis of the objective lens, and a light control for varying the length of film exposed to light passed by the lenses.

9. In a motion picture camera, a stationary objective lens, means for continuously moving a strip of film longitudinally behind and across the axis of said lens, a continuously moving series of light-deflecting lenses passing across the axis of the objective lens at a single point between the objective lens and film, a mat for regulating the amount of light passed to the film, a corrective lens in the path of light to the film behind the point where the moving series of lenses cross the axis of the objective lens, and a light control located immediately in front of the film for regulating the length of film exposed to light passed by the lenses.

10. In motion picture apparatus, an annular series of lenses revolving about an axis coincident with the series, an objective lens mounted with its axis radial to that of the series, means supporting a film with a portion within the lens series and intersecting the axis of the objective lens, a sprocket within the series of lenses for engaging and moving the film, a pinion concentric with the series of lenses and operating with the series of lenses, a gear fixed with the sprocket and meshing with the pinion, and a sprocket offset from said first mentioned sprocket to be outside of the series of lenses concentric with and operating with the series of lenses and engaging the film at spaced points to feed it into and out of the series of lenses.

11. In motion picture apparatus, an annular series of lenses, means for revolving said series of lenses about an axis coincident with the series, an objective lens mounted with its axis radial to that of the series, means supporting a film with a portion within the series of lenses and intersecting the axis of the objective lens, film engaging sprockets within the series of lenses at the ends of said portion of film to drive it, a drive pinion concentric with the series of lenses and operating with the series of lenses, and a gear fixed with each sprocket and meshing with the pinion.

12. In motion picture apparatus, an annular series of lenses revolving about an axis coincident with the series, an objective lens mounted with its axis radial to that of the series, means supporting a film with a portion within the series of lenses and intersecting the axis of the objective lens, film engaging sprockets within the series of lenses at the ends of said portion of film to drive it, a film-feeding sprocket offset from said sprockets to be outside of the series of lenses operable to feed film into and out of the series of lenses, and means whereby the series of lenses, the said sprockets and the feed sprocket operate in synchronism.

13. In motion picture apparatus, an annular series of lenses revolving about an axis coincident with the series, an objective lense mounted with its axis radial to that of the series, means supporting a film with a portion within the series of lenses and intersecting the axis of the objective lens, film engaging sprockets within the series of lenses at the ends of said portion of film to drive it, a film-feeding sprocket offset from said sprockets to be outside of the series of lenses operable to feed film into and out of the series of lenses, a shaft carrying the feed sprocket and concentric with and operating with the series of lenses, a drive pinion concentric with and operating with the series of lenses, and a gear fixed with each of said film engaging sprockets and meshing with the pinion.

14. In motion picture apparatus, an annular series of lenses revolving about an axis coincident with the series, an objective lens stationary at the exterior of the series with its axis radial to that of the series, a film gate within the series of lenses for guiding a film flat across the axis of the objective lens at right angles thereto, the gate having an aperture through which the film is exposed, film-driving sprockets at the ends of the gate, and a single feed sprocket outside of the series of lenses operating to both feed the film to and receive it from the drive sprockets.

15. In motion picture apparatus, a body, an annular series of lenses mounted in the body to revolve about an axis coincident with the axis of the series of lenses, a main lens mounted at the front of the body and held stationary with its axis radial to that of the series of lenses, the body having a part extending into the annular series of lenses, a film guide carried by said part of the body, and means carried by said part of the body operable to vary the amount of film exposed to light from the main lens.

16. In motion picture apparatus, a body, an annular series of lenses mounted in the body to revolve about an axis coincident with the axis of the series of lenses, a main lens mounted at the front of the body and held stationary with its axis radial to that of the series of lenses, the body having a part extending into the annular series of lenses, a film guide carried by said part of the body, and a corrective lens carried by said part of the frame within the annular series of lenses and in the path of light to the film in the film guide.

17. In motion picture apparatus, a body, an annular series of lenses mounted in the body to revolve about an axis coincident with the axis of the series of lenses, a main lens mounted at the front of the body and held stationary with its axis radial to that of the series of lenses, a part adapted to extend into the annular series of lenses, a film guide carried by said part to support film within the series of the lenses and means detachably connecting said part and the body.

18. In motion picture apparatus, a body, an annular series of lenses mounted in the body to revolve about an axis coincident with the axis of the series of lenses, a main lens mounted at the front of the body and held stationary with its axis radial to that of the series of lenses, a part adapted to extend into the annular series of lenses, a film guide carried by said part to guide a film within said series of lenses, and a corrective lens carried by said part within the annular series of lenses and in the path of light to the film in the film guide, and means for detachably connecting said part and the body.

19. In motion picture apparatus, a body having a detachable part, a lens carrier rotatably mounted in the body, a series of lenses at the periphery of the lens carrier projecting axially therefrom, a main lens mounted at the front of the body with its axis radial to that of the lens carrier and intersecting the series of lenses, a film guide carried by said part of the body to be within the series of lenses and supporting a film within the series of lenses and in line with the main lens.

20. In motion picture apparatus, a body, an annular series of lenses mounted in the body to revolve about an axis coincident with the axis of the series of lenses, a main lens mounted at the front of the body and held stationary with its axis radial to that of the series of lenses, the body having a part extending into the annular series of lenses, a film guide carried by said part of the body to guide a film within the series of lenses, and a reflector carried by said part of the body to be shiftable into and out of position in the path of light passed by the main lens where it reflects off the light to facilitate focusing of the main lens.

21. In motion picture apparatus, a body, an annular series of lenses mounted in the body to revolve about an axis coincident with the axis of the series of lenses, a main lens mounted at the front of the body and held stationary with its axis radial to that of the series of lenses, the body having a part extending into the annular series of lenses, a film guide carried by said part of the body to guide a film within the series of lenses, and a focusing device carried by said part of the body and including a ground glass and a reflector shiftable into and out of position in the path of light passed by the main lens where it reflects said light onto the ground glass.

GABRIEL GARCIA MORENO.